3,488,922
**METHOD AND APPARATUS FOR CHROMATO-
GRAPHIC SEPARATIONS WITH SUPERFICIALLY
POROUS GLASS BEADS HAVING SORPTIVELY
ACTIVE CRUSTS**
Joseph J. Kirkland, Wilmington, Del., assignor to E. I. du
Pont de Nemours and Company, Wilmington, Del., a
corporation of Delaware
Filed Oct. 10, 1968, Ser. No. 766,499
Int. Cl. B01d 55/08
U.S. Cl. 55—67      14 Claims

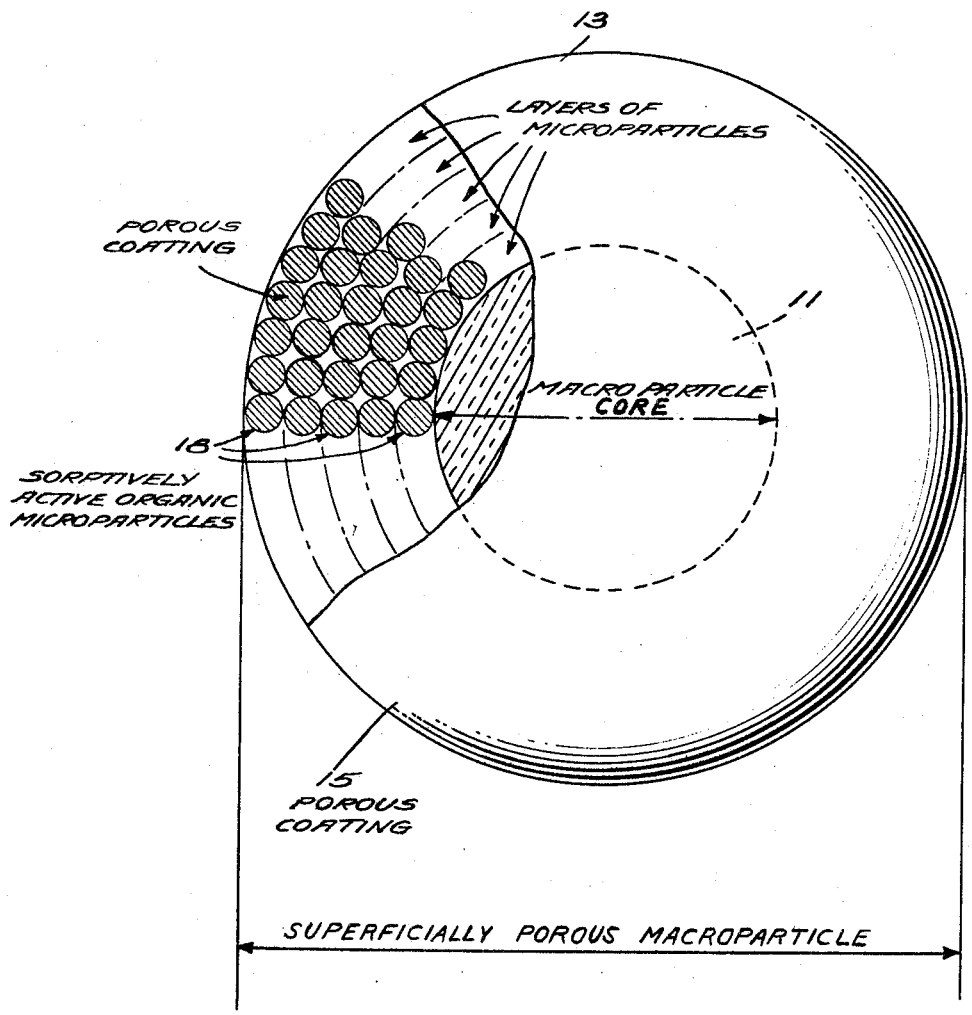

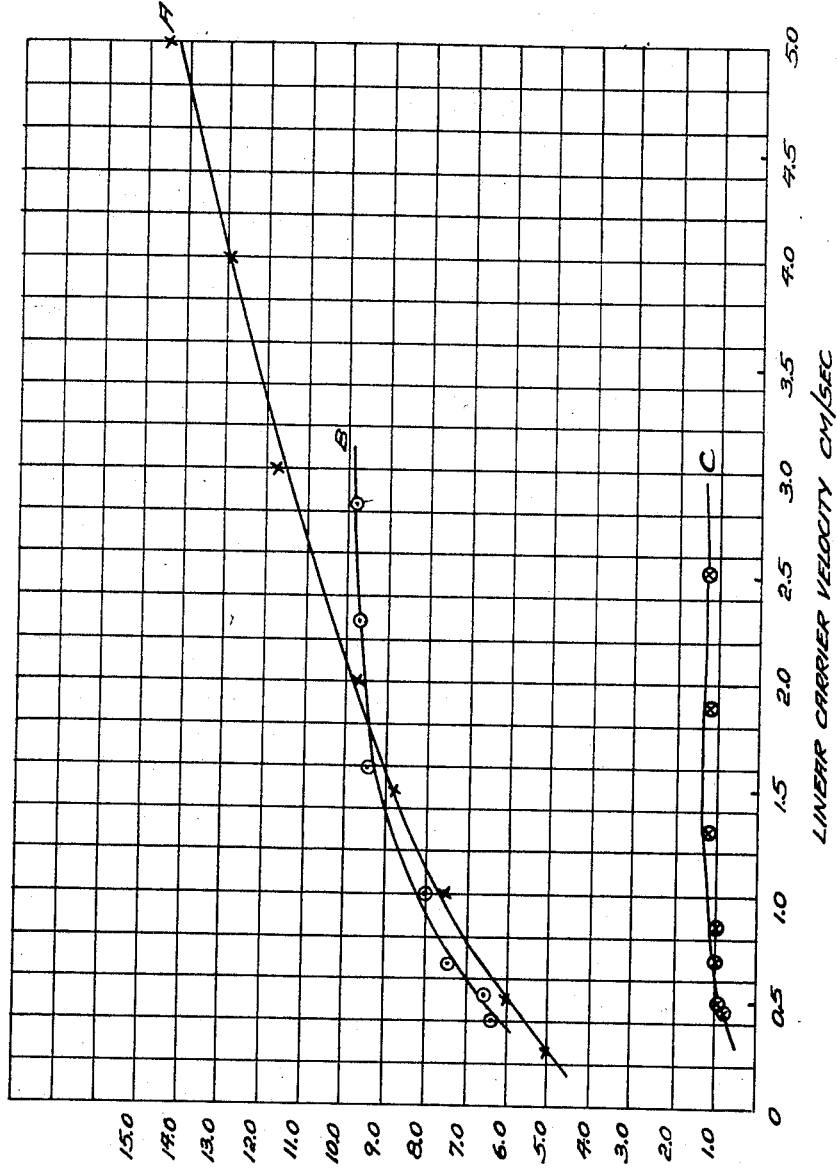

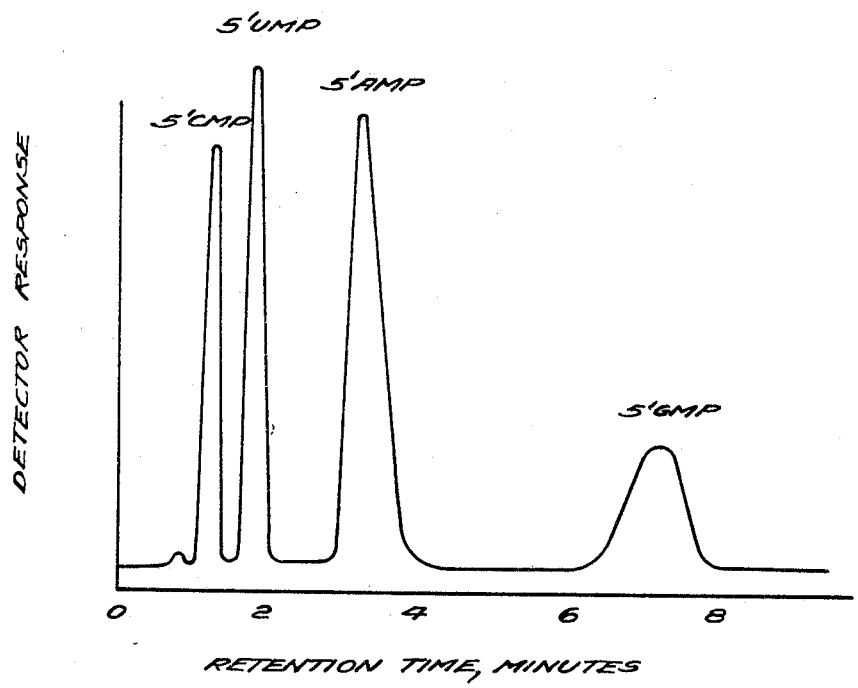

ABSTRACT OF THE DISCLOSURE

Macroparticles having impervious cores and superficially porous crusts comprising one or more monolayers of sorptively active colloidal organic microparticles, used as packing in a chromatographic column, improve the efficiency of the chromatographic separation.

Background of the invention

This invention relates to chromatography. In a chromatographic process, it is customary to pass a mixture of the components to be resolved in a carrier fluid through a chromatographic apparatus or separative zone. The separative or resolving zone generally contains a material which has an active chromatographic sorptive function.

The chromatographic apparatus generally employed are columns. These are open tubes which have been packed with a granular material. For analytical work, the columns are usually of small internal diameter in the millimetric range. They are of larger diameter for preparative chromatography. Commonly employed support materials are granules having sorptively active surfaces or surfaces which have been coated with a substance which is sorptively active. Passing the mixture to be separated through the column results in repeated interactions associated with the chemical nature of the different components and the chromatographically-active surfaces. Different compounds will have different retention times on the column due to these repeated interactions. The column eluent is generally passed through a detector, for example a ionization detector, to indicate when the resolved components emerge from the column and to permit the measurement of the retention times and amounts of each.

It has long been recognized that ideal chromatographic supports would consist of a plurality of discrete particles of perfectly regular shape, preferably spheres, having surfaces with a large number of superficial shallow pores and no deep pores. In order for different columns to give reproducible chromatographic results, the support granules should be regular and their surface characteristics readily controllable and reproducible. This has been very difficult to realize in practice.

British Patent No. 1,016,635 discloses a chromatographic support made by coating a particulate refractory solid on an impermeable core. The coating is accomplished by dispersing the coating material in a suitable liquid in a slurry. The cores are then coated with the slurry, withdrawn and dried to remove the liquid. The result is a rather loosely held, mechanical coating of non-uniform disoriented particles. These coated cores may be used as chromatographic supports although they suffer from several disadvantages. The coatings are subject to easy removal as by chipping and flaking. Such variables as thickness and uniformity of coating cannot be controlled since, due to surface tension, the coating is thicker at the points of contact between the cores than elsewhere. It would be desirable to have the coated material irreversibly bonded to the core and ideally the bonding process would be such that the coating would be uniform, of predictable thickness, and of predeterminable porosity.

Kirkland (Kirkland, J. J., "Gas Chromatography 1964," A. Goldup, editor, the Institute of Petroleum, London, W. 1, pp. 285–300, 1965) has described the preparation of a chromatographic support by bonding successive layers of silica microparticles to glass beads by means of very thin fibrillar boehmite films. These coated cores may be employed as chromatographic adsorbants or supports, but suffer from the serious disadvantage of having a chemically inhomogeneous surface. The small but significant amount of high surface alumina which is present in the porous layer is deleterious for certain types of separations due to the adsorption or reacting properties of the alumina.

Coated glass beads consisting of a single layer of finely divided diatomaceous earth particles bonded to the glass beads with fibrillar boehmite have also been described as a chromatographic support [Kirkland reference as above; Kirkland, J. J., Anal. Chem. 37, 1458–1461, (1965)]. The disadvantage of this material as a chromatographic support is that the surface again is not chemically homogeneous. In addition, it is not possible to prepare such structures with a uniform surface and with a certain predetermined porosity.

A method of depositing colloidal particles of a given size and ionic charge from aqueous dispersion onto the surface of a solid, a single monolayer of particles at a time, and by repeating the process to coat the surface with any desired number of monolayers is described by R. K. Iler in Canadian Patent No. 729,581 issued Mar. 8, 1966, assigned to E. I. du Pont de Nemours & Company, Wilmington, Del., U.S.A. Shown also is a solid-state substrate to a surface of which there is irreversibly joined a coating comprising several monolayers of colloidal particles, the particles in each monolayer being alike and being different from the colloidal particles in an adjoining monolayer. This is also described in a copending U.S. patent application, Ser. No. 477,635, filed July 22, 1965, assigned to E. I. du Pont de Nemours & Company.

The chromatographic supports of the present invention are macroparticles having superficially porous crusts of sorptively active material, formed on impervious cores by the method of Iler. The use of macroparticles having superficially porous crusts formed by the method of Iler is described in copending U.S. application, Ser. No. 647,506, filed July 20, 1967, by Joseph J. Kirkland, and assigned to E. I. du Pont de Nemours and Company. That application does not describe the use of macroparticles which have discrete layers of sorptively active organic material within the crust.

Chromatographic supports having sorptively active surfaces have been described in the literature. The use of surface modified polystyrene for ion exchange chromatography was first demonstrated by Pepper (R. W. Pepper, Chemistry Research, 1952, Her Majesty's Stationary Office, London, England). This approach was more recently discussed by Horvath et al. (C. G. Horvath, B. A. Preiss, and S. R. Lipsky, Anal. Chem., 39, 1422, 1967) as "pellicular ion exchange chromatography," involving thin shells of ion exchangers made by polymerizing organic polymers on the surface of glass beads and chemically modifying the organic shell to produce the desired sorbent. Beads of crosslinked polystyrene which contain ion exchange groups only in a shallow surface layer have also been used for superficial ion exchange chromatography (J. R. Parrish, Nature, 207, 402, 1965).

None of the above-mentioned reference mention macroparticles which have superificially porous crusts having discrete layers of sequentially adsorbed, sorptively active organic microparticles.

Unexpectedly efficient separations have been obtained by the use of chromatographic supports consisting such macroparticles. Furthermore, the macroparticles as formed by the hereindescribed adaptation of the Iler method are directly useable as chromatographic supports since sorptively active material is incorporated in the crusts as an integral part thereof. The macroparticles of this invention also improve column efficiency and the speed with which chromatographic separations may be made.

Brief description of the drawings

FIGURE 1 is a diagrammatical representation of a cross-section of a chromatographic support macroparticle of this invention.

FIGURE 2 is a graph of the height equivalent of a theoretical plate versus linear carrier velocity for three chromatographic columns. Curve A is the curve obtained with a column having the best prior art packing material for the subject compounds. Curves B and C were obtained with columns having a packing consisting of the macroparticles of this invention.

FIGURE 3 is a chromatogram of a solution of ribonucleoside-5'-monophosphoric acids, which consists of cytidine - 5'-phosphate (5' CMP), uridine-5'-phosphate (5'-UMP), adenosine-5'-phosphate (5' AMP) and guanosine-5'-phosphate (5' GMP) made with a column having a packing of the macroparticles of this invention as described in Example I.

Summary of the invention

It has been found that macroparticles with impervious cores having adsorbed monolayers of sorptively active colloidal organic microparticles provide excellent chromatographic packings. The prior art difficulties of non-uniformity, lack of pre-determinability of thickness and pore size, and poor adherence of the coating to the core are reduced or substantially eliminated with macroparticles having impervious cores to which microparticles are uniformly and irreversibly bonded, one monolayer at a time to the macroparticle core, forming a superfically porous crust thereon. Incorporation of monolayers of sorptively active collidal organic microparticles in the porous crust yields macroparticles that are directly useable as chromatographic supports without treatment with sorptively active material. They are therefore not subject to the loss of uniformity which often occurs as a result of a mechanical coating with sorptively active material.

The chromatographic support for use in the present invention may be produced by the process of Canadian Patent No. 729,581 which consists of coating impermeable macroparticle cores with a series of unlike, oppositely charged, sequentially adsorbed monolayers of like colloidal microparticles. (By "like particles" it is meant that the particles of any given monolayer are of similar charge, and preferably, although not necessarily, of the same chemical composition.) The coating process causes the coating to be irreversibly joined to the macroparticle by means of electrostatic forces in the nature of a chemical or partial valence bond.

Coating is accomplished by contacting macroparticles bearing a surface charge with a colloidal dispersion of material which has an opposite charge. These colloidal particles will be attracted to the oppositely-charged macroparticles and become electrostatically bonded thereto. The surface of the macroparticle will then assume an electrical charge which is now opposite to that which was on the surface originally. The reason for this is that once the colloidal particle sticks to the macroparticle, the surface charges are neutralized so the coated spot no longer appears oppositely charged to the colloidal particles remaining in the dispersion. Therefore, no further colloidal particles will be attracted, and there will be no further build-up of particles at that spot. Excess colloid is removed by rinsing, and the coated macroparticle is then immersed in a second colloidal dispersion of microparticles of charge opposite from those of the first. Repeating the process by alternating immersions between positively and negatively charged microparticle dispersions results in the adsorption of further monolayers in sequence. Each monolayer will be of a different material than those adjacent. After the desired number of monolayers of microparticles has been built up, the beads are washed, rinsed and dried under vacuum.

Preferred materials are glass beads for the impervious cores and commercial ion exchange resins, such as "Amberlite" (Rohm & Haas Co.), for the sorptively active material. If monolayers of inorganic material are to be included in the porous crust, a silica sol is the preferred material therefor.

The macroparticles of this invention may be used in various apparatus and processes for ion exchange chromatography, the most common use being as a packing material in chromatographic columns.

Detailed description

FIGURE 1 shows the structure of a chromatographic support macroparticle of the type claimed. The impervious core 11 is preferably glass or other ceramic material and has a porous coating 15 made up of sequentially adsorbed monolayers 13 of microparticles. In one embodiment of the invention alternate monolayers of sorptively active colloidal organic microparticles 18 are separated by monolayers of microparticles having an opposite charge. It is not necessary that the microparticles be spherical as shown; they may also be fibrillar or of other shape.

Such macroparticles are produced by the method of particle deposition described by Iler in Canadian Patent No. 729,581. Adaptations of this method to produce chromatographic supports are disclosed in the copending application, Ser. No. 647,506. Macroparticles of the instant invention may be produced by substituting sorptively active organic material for the material used to form the organic "interlayers" of Ser. No. 647,506. It is not necessary to alternate between organic and inorganic monolayers in the instant invention however; the crust may be made up entirely of organic material as long as each monolayer is of a charge opposite to that of the monolayer which was deposited before it. Of course there is no volatilization of interlayers in preparation of the macroparticles of this invention, and none of the materials therefore need be refractory.

Glass beads have a negative surface charge so that when they are used as the impervious cores a layer of particles having a positive surface charge is deposited first. The coating is built up by alternating between coatings of positively and negatively charged particles. Either cation exchange resins such as sulfonated polystyrenes or polyacrylic acids or anion exchange resins such as polymers having quaternary ammonium or pyridinium groups may be used as the sorptively active organic material.

Where the negatively charged particles are to be colloidal silica, a sol may be prepared in the following manner:

Silicon metal is ground to small particle size and treated with hydrofluoric acid to activate the metal. A heel of 100 m$\mu$ particle size silica sol containing ammonium hydroxide is incrementally added. After addition of all of the metal, the mixture is agitated for 50 minutes and then the reaction mixture is filtered. Concentration is performed by slowly heating to remove excess ammonia and then the mixture is boiled to lower the water content and thereby concentrate the silica sol which contains an average particle size of about 200 m$\mu$.

A sol of smaller particle size may be prepared in essentially the same manner.

After preparation of the silica sol the glass beads are cleaned with an alkaline laboratory glass cleaner. The cleaner is then removed by continuous washings with water and the beads are dried. The beads are contacted with a dispersion of sorptively active colloidal organic microparticles. This dispersion may be formed from commercial ion exchange resins. The beads are again washed and dried. Next the beads are stirred in a silica sol solution. The excess sol solution is removed and the beads are washed with water and dried.

The alternate coating treatment is repeated three more times as above and after the last silica sol solution is removed, the beads are washed with isopropanol and vacuum dried.

The microparticle coating, which forms the porous crust, may consist of any number of layers and will normally constitute from 0.002 to 25% of the total volume of a mcroparticle and will have a thickness of 0.01 to 2 microns. The overall size of the macroparticles depends primarily on the size of the impervious cores and somewhat on the thickness of the porous crust. The average diameter of the macroparticles may be from 5 to 500 microns, the actual size to be used being determined by the type of separation to be performed. Small macroparticles produce a small column HETP. The microparticles are of colloidal size, being adsorbed from a dispersion. Their average diameter may be from 0.005 to 1 micron, the size normally used being 0.01 to 0.2 micron. The uniform pores in the porous crust have diameters of 2 to 500 millimicrons depending on the size and shape of the microparticles. The microparticles and macroparticles may be of any shape—preferably spherical. A capillary tube having an internal diameter of 5 to 500 microns may serve as an impervious core, microparticles being coated on the interior thereof.

EXAMPLE I

An example of chromatographic macroparticles of the instant invention is glass beads with a crust, starting from the surface, consisting of a layer of particles of "Amberlite XE–255" (Rohmn & Haas Co., Philadelphia, Pa.) strongly basic anion exchange resin having diameters of 100 to 500 millimicrons, a layer of "Ludox AM" (an alumina-modified silica) and another layer of "Amberlite XE–255" particles.

These may be prepared by soaking sixty grams of 24 to 52 micron soda-lime-silica glass beads for about one hour in a 0.5% solution of an alkaline detergent laboratory glass cleaner. The cleaned beads are washed thoroughly with water to eliminate the detergent. The wet beads are transferred to a coarse sintered glass Buchner funnel and air-dried on the filter, and then dried for one hour at 115° C. in an air oven.

To these clean beads is added a suspension of 0.5% of a suspension of 100 to 500 millimicron microparticular, quaternary ammonium chloride salt form of a crosslinked, strong-base type polystyrene ion exchange resin, such as "Amberlite XE–255," so that a thin slurry of the beads is formed. This mixture is allowed to stand for 20 minutes with gentle stirring about every five minutes. The excess suspension is removed by gentle vacuum filtration, and the treated glass beads are washed five times with distilled water with gentle stirring. The treated beads are then air-dried on the filter. The beads are thus coated with a monolayer of microparticles of ion exchange resin. The coated beads are returned to the funnel and an excess of a 1% solution of "Ludox AM" is added. This colloidal silica consists of 15 millimicron spheres of amorphous silica bearing a negative ionic charge on the surface of the particles by reason of aluminosilicate ions at a pH of 7 to 9. The resulting mixture is allowed to stand for 5 minutes and the excess "Ludox" sol removed by vacuum filtration. The bead bed is washed with distilled water until the filtrate is clear and the resulting material is air-dried on the filter. The beads are transferred to a vacuum oven and heated at 50° for one hour. The microparticles of resin have now been coated with microparticles of silica.

The treated beads are returned to the Buchner funnel and an excess of the 0.5% ion exchange slurry is added. The treatment is continued as described above, in order to place a second layer of micro ion exchange particles on the surface of the glass beads. After the treatment and drying operation, a third layer of ion exchange particles is placed on the beads using the treatment described above. The final sample is heated in the vacuum oven at 50° for one hour. The glass beads have now been coated with microparticles of anion-exchange resin alternated with interlayers of still smaller microparticles of silica.

The surface of the final material, determined by nitrogen flow procedure on a sample which is dried at 50° C. under vacuum for 16 hours, is about 0.5 m.$^2$/g.

FIGURE 2 illustrates the chromatographic performance of two ion exchange columns having a packing of the described macroparticles as compared with that of a column having a packing of "pellicular" anion exchange particles as described by Horvath, Preiss and Lipsky (Anal. Chem. 39, 1422 1967). Curves A, B and C are plots of the height equivalent of a theoretical plate (HETP) in millimeters versus linear carrier velocity in centimeters per second. Curve A is a plot of the Horvath et al., data obtained on a 193 cm. x 1 mm. I.D. column of 270 to 325 mesh "pellicular" anion exchange particles using 5'-uridine-monophosphoric acid as the test compound. These data represent the best of this type heretofore disclosed in the literature. Curve B describes the data obtained on a column having the packing of this invention wherein the glass beads are 230 to 270 mesh. These values were obtained on a 100 cm. x 2.1 mm. I.D. column operated at 60° C. with carrier of 0.02 $NKH_2PO_4$ to 0.002 $NH_3PO_4$. As may be seen, the HETP does not rise as fast with linear carrier velocity as with the packing of Column A; were the microparticle coating of the packing of curve B thinner, the ratio of HETP to linear carrier velocity could be further improved (i.e., lowered). Curve C gives values obtained with packing prepared by depositing superfine particles of "Amberlite XE–255" on glass beads of less than 400 mesh. It can readily be seen that the Column C provides almost an order of magnitude of improvement.

The performance of the test exchange packing has been demonstrated in the separation of nucleotide test systems. Below are the structures of two ribonucleoside-monophosphoric acids:

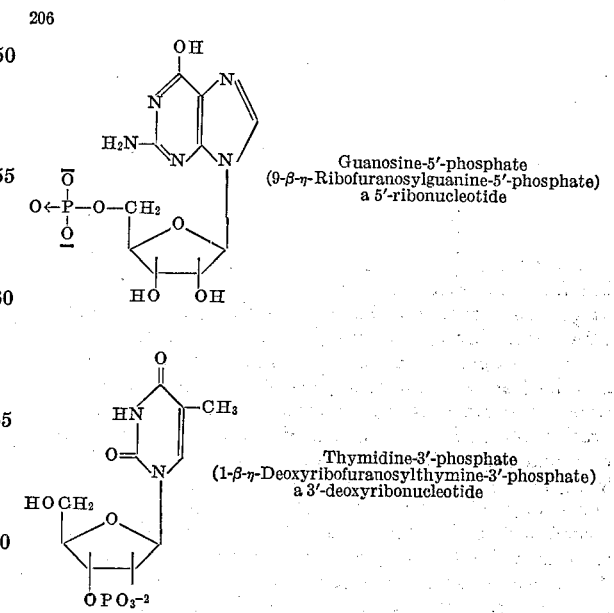

Guanosine-5'-phosphate
(9-β-η-Ribofuranosylguanine-5'-phosphate)
a 5'-ribonucleotide Thymidine-3'-phosphate
(1-β-η-Deoxyribofuranosylthymine-3'-phosphate)
a 3'-deoxyribonucleotide The separation of complex molecules such as these presents considerable difficulty because of their high molecular weight and structural similarities. The packing of Example I was used to separate the ribonucleoside-5'-monophosphoric acid system (cytidine-5'-phosphate, uridine-5'-phosphate, adenosine-5'-phosphate, guanosine-5'-phosphate) in the following manner:

The lower end of a 2 mm. I.D. x 1 meter length of precision bore stainless steel tubing was fitted with a small disc of porous "Teflon." Small portions of the dry ion exchange packing were placed in the tube, and the bottom of the column was tapped on the bench between additions. The side of the column was also gently rapped with the wooden handle of a spatula during the packing process. After filling the column, the top was plugged with a small wad of quartz wool.

A liquid chromatographic apparatus (J. J. Kirkland, Anal. Chem. 40, 391–396 1968) was equilibrated with a carrier composed of 0.02 N $KH_2PO_4$ to 0.002 N $H_3PO_4$ operated at 60° C. Five microliters of a 0.5 mg./ml. solution of the ribonucleoside-5'-monophosphoric acids were then injected into the top of the column operated at a carrier flowrate of 1.91 cc./min. Under these conditions, the chromatogram shown in FIGURE 3 was obtained using a continuous detector consisting of an ultraviolet photometer operating at 254 millimicrons with a full scale sensitivity of 0.05 absorbance units. A complete separation of these closely similar compounds was accomplished in about 8 minutes. This compares to the more than 45 minutes required for the separation of the same compounds by the fastest procedure described in the literature (see Horvath et al., supra).

Another example of the superiority of the chromatographic packing of the instant invention is the separation of ribonucleoside-2',3'-monophosphoric acid mixtures. Separation of this system using the "pellicular" ion exchange column of Horvath et al., required about 1½ hours, while the separation with a column having a packing of the macroparticles of this invention required only 13 minutes.

EXAMPLES II THROUGH VII

The procedure of Example I is followed by substituting for those materials the materials shown in Table 1 as the macroparticles, the microparticles, and the unlike (alternating layer) microparticles in the preparation.

Chromatographic columns packed with the materials described above show good separative properties. For instance, the materials in Example II are useful for separating compounds by means of cation exchange liquid chromatography. The materials in Examples III, IV and V exhibit the ability to separate compounds by gas-solid chromatography. The material in Example VI, when coated with a thin film of a suitable partitioning liquid, such as polyethylene glycol (molecular weight 200 to 400), are suitable for separating wide varieties of organic materials by gas-liquid and liquid-liquid chromatography. The material in Example VII demonstrates useful properties for liquid chromatographic separations, particularly in the resolution of macromolecules, either naturally-occurring or synthetic by means of a diffusion-sizing operation, somewhat analogous to gel filtration and gel permeation chromatographic separations which are practiced with certain organic gels as packings. Diffusion-sizing operation is possible because of the regular and predictable porosity of the porous coating.

The examples show only a few compounds in the class of sorptively active materials. A material is sorptively active with respect to another if the flow of one past the other is retarded by interactions between the substances. When a mixture of materials to be separated is passed through the sorptively active packing of a chromatographic column, the components of the mixture are selectively retarded by the packing, thereby effecting separation. The interactions may be of several types, including ion exchange, adsorption by hydrogen bonding or Van der Waals forces, partitioning, and selective diffusion. Materials exhibiting sorptive activity with a wide variety of other materials include carbon; graphite; natural gums such as alginates, pectins and gallactans; proteins; natural latex; and synthetic organic polymers such as polystyrene, polyacrylonitrile and polyacrylic acids. Certain inorganic compounds may also be sorptively active, such as metal oxides and sulfides.

TABLE 1

| Example No. | Macroparticle A | Microparticle B | Unlike Microparticles (Interlayers) C | Sizes A | B | C |
|---|---|---|---|---|---|---|
| II | Glass beads | Fibrillar boehmite | Macroreticular, strongly acidic (sulfonic) Na+ salt form of polystyrene resin. | 20–37μ | 50×1000 mμ | 0.1–0.5μ |
| III | Sand | "Reten"-205 cationic polymer. | Aluminosilicate (molecular sieve). | 105–149μ | 25 mμ | 0.2–0.5μ |
| IV | Diatomaceous earth granules. | Bovine serum albumin (pH 3). | Kaolin | 175–200μ | 10 mμ | 100 mμ |
| V | Alpha alumina crystals | Linear methacrylic acid | Zirconia | 74–105μ | 5 mμ | 25 mμ |
| VI | Stainless steel capillary | Diatomaceous earth | β-Methacryloxy-ethyldiethyl methyl ammonium methyl sulfate. | 25μ i.d. | 0.05–0.1μ | 50 mμ |
| VII | Alumina berls | Dow polystyrene latex | Poly(diethylaminoethyl methacrylate acetate. | 1 mm | 100 mμ | 10 mμ |

In a preferred aspect of the invention, impervious spherical glass or silica macroparticles of 37–44 micron diameter are coated by the adsorption of alternate monolayers of 100–500 millimicron diameter cationic organic polymer microparticles and of spherical microparticles of amorphous silica, having an average particle diameter of 15 millimicrons. The silica is thus present as interlayers between layers of the organic particles. In another preferred aspect, impervious 5 to 100 micron diameter spherical glass or silica macroparticles are coated by the adsorption of alternate monolayers of anionic organic polymer microparticles having dimensions of 100 to 1000 millimicrons and boehmite microfibrils having an average diameter of 50 Angstroms and length of 1000 Angstroms.

The porous crust of the preferred products consists of layers of microparticles with a total thickness of 0.1 to 2 microns.

An embodiment of the claimed chromatographic process is the passage of materials to be separated in a carrier phase through the separative zone of a chromatographic column wherein they are contacted with the described macroparticles. The separation is accomplished by the selective retention of the materials to be separated, the extent of which may be measured by a variety of techniques, including continuous monitoring. Measurement of the time and quantity of retention of the components of a mixture being analyzed yields a chromatogram, which identifies the components separated. Variations and modifications of the steps in the chromatographic process and of the apparatus are described in elementary texts. The macroparticles of this invention are of general usefulness in chromatography, and the situations in which they may be used will be apparent to those skilled in the art.

I claim:

1. A chromatographic apparatus having a packing comprising a plurality of superficially porous macroparticles, each of said macroparticles having an impervious core, each core being coated with a multiplicity of monolayers of microparticles, the microparticles of a monolayer being unlike those in the adjacent monolayers, at least one of said monolayers containing sorptively active organic microparticles.

2. The apparatus of claim 1 wherein said macroparticles have an average diameter of 5 to 500 microns, said microparticles having an average diameter of 0.005 to 1 micron, the volume of said microparticles constituting from 0.002 to 25% of the total volume of a macroparticle.

3. The apparatus of claim 2 wherein said sorptively active organic microparticles are made of a material selected from the group consisting of carbon, natural latex, natural gums, proteins, synthetic polymers and ion exchange resins.

4. The apparatus of claim 3 wherein said multiplicity of monolayers comprises alternate monolayers of inorganic microparticles and alternate monolayers of microparticles of a sorptively active organic material.

5. The apparatus of claim 4 wherein said inorganic microparticles consist of silica.

6. The apparatus of claim 5 wherein said impervious core is made of a material selected from the group consisting of glass, sand, alumina, and ceramic materials.

7. A chromatographic column having a packing comprising a plurality of superficially porous macroparticles, each of said marcoparticles having a spherical glass core, said core being coated with alternate monolayers of silica microparticles and alternate monolayers of ion exchange resin microparticles.

8. The column of claim 7 wherein said core has a diameter of 37 to 44 microns, said silica microparticles having an average diameter of about 15 millimicrons, said ion exchange resin microparticles having an average diameter of 100 to 500 millimicrons, the thickness of the coating of microparticles on a core being from 0.1 to 2 microns.

9. An improved process for performing chromatographic separations comprising
placing the materials to be separated in carrier fluid,
contacting said materials with a plurality of superficially porous macroparticles, each of said macroparticles having an impervious core, each core being coated with a multiplicity of monolayers of microparticles, each of said monolayers consisting of microparticles unlike those in the adjacent monolayers, at least one of said monolayers containing sorptively active organic microparticles, and
determining the extent of retention of said materials by said macroparticles.

10. The process of claim 9 wherein said macroparticles have an average diameter of 5 to 500 microns, said microparticles having an average diameter of 0.005 to 1 micron, the volume of said microparticles constituting from 0.002 to 25% of the total volume of a macroparticle.

11. The process of claim 10 wherein said sorptively active organic microparticles are made of a material selected from the group consisting of carbon, natural latex, natural gums, proteins, synthetic polymers and ion exchange resins.

12. The process of claim 11 wherein said multiplicity of monolayers comprises alternate monolayers of inorganic microparticles and alternate monolayers of microparticles of a sorptively active organic material.

13. The process of claim 12 wherein said inorganic microparticles consist of silica.

14. The process of claim 13 wherein said impervious core is made of a material selected from the group consisting of glass, sand, alumina, and ceramic materials.

References Cited

UNITED STATES PATENTS 3,340,085    9/1967    Halasz et al. _____ 55—386 X

FOREIGN PATENTS 729,581    3/1966    Canada.
1,016,635    1/1966    Great Britain.

OTHER REFERENCES

Kirkland, J. J.: "Some Modified Gas Chromatographic Adsorbents and Supports," Gas Chromatography 1964, The Institute of Petroleum—London, pp. 285–300.

JAMES L. DECESARE, Primary Examiner